(12) United States Patent
Lee

(10) Patent No.: US 7,210,837 B2
(45) Date of Patent: May 1, 2007

(54) GUIDING LIGHT PLATE APPLIED TO PERIPHERALS

(75) Inventor: Fu-Tien Lee, Rucho (TW)

(73) Assignee: Welland Industrial Co., Ltd., Taipei Hsien (TW)

( * ) Notice: Subject to any disclaimer, the term of this patent is extended or adjusted under 35 U.S.C. 154(b) by 20 days.

(21) Appl. No.: 11/078,432

(22) Filed: Mar. 14, 2005

(65) Prior Publication Data

US 2006/0139951 A1   Jun. 29, 2006

(30) Foreign Application Priority Data

Dec. 24, 2004   (TW) ............................... 93220918 U

(51) Int. Cl.
*F21V 7/04* (2006.01)
(52) U.S. Cl. ...................... 362/606; 362/623; 362/612; 362/351; 362/560
(58) Field of Classification Search ................ 362/604, 362/605, 606, 609, 612, 617, 351, 252, 555, 362/560, 511, 565, 623, 628, 631, 633, 26
See application file for complete search history.

(56) References Cited

U.S. PATENT DOCUMENTS

| | | | | |
|---|---|---|---|---|
| 5,054,885 A | * | 10/1991 | Melby | ......................... 359/618 |
| 5,239,450 A | * | 8/1993 | Wall | ............................ 362/104 |
| 5,453,855 A | * | 9/1995 | Nakamura et al. | ............ 349/58 |
| 6,942,374 B2 | * | 9/2005 | Lee | ............................ 362/615 |
| 2003/0184990 A1 | * | 10/2003 | Lin | ............................. 362/31 |
| 2004/0184258 A1 | * | 9/2004 | Sung | ........................... 362/31 |

\* cited by examiner

*Primary Examiner*—Renee Luebke
*Assistant Examiner*—Zahra I. Bennett
(74) *Attorney, Agent, or Firm*—Rosenberg, Klein & Lee

(57) ABSTRACT

A guiding light plate applied to peripherals includes an LED (Light-Emitting Diode) disposed on a predetermined one of the peripherals, a reflection plate is disposed in the predetermined peripheral, and an image lid is arranged in front of the reflection plate. The reflection plate has a slot type light-guiding face, and the LED is arranged in a side of the light-guiding face. The image lid has at least one transparent image portion.

8 Claims, 4 Drawing Sheets

GUIDING LIGHT PLATE APPLIED TO PERIPHERALS

BACKGROUND OF THE INVENTION

1. Field of the Invention

The present invention relates to a guiding light plate applied to peripherals, and particularly relates to a guiding light plate applied to peripherals, for showing their power and operational states, distributing light and having better imaging effects.

2. Description of Related Art

As the PC industry has rapidly developed, various peripherals, such as computer external casing, hubs, or card readers, have also progressed. Most conventional peripherals have an LED disposed on their casing or panel thereof for displaying their power or operational states. But, the illumination of the LED provides little effect without images.

Hence, an improvement over the prior art is required to overcome the disadvantages thereof.

SUMMARY OF THE INVENTION

A guiding light plate can be applied to peripherals to show their power and operational states and, moreover, to provide LED-projecting lights to a reflection plate to generate uniform light distribution, and further utilize an image lid for project an image, so as to embellish and advertise the peripherals thereof.

A guiding light plate applied to peripherals includes an LED (Light-Emitting Diode) disposed on a predetermined one of the peripherals, a reflection plate disposed in the predetermined peripheral, and an image lid arranged in front of the reflection plate. The reflection plate has a light-guiding face of a slot type, and the LED is arranged in a side of the light-guiding face. The image lid has at least one transparent image portion.

To provide a further understanding of the invention, the following detailed description illustrates embodiments and examples of the invention. Examples of the more important features of the invention have thus been summarized rather broadly in order that the detailed description thereof that follows may be better understood, and in order that the contributions to the art may be appreciated. There are, of course, additional features of the invention that will be described hereinafter which will form the subject of the claims appended hereto.

BRIEF DESCRIPTION OF THE DRAWINGS

These and other features, aspects, and advantages of the present invention will become better understood with regard to the following description, appended claims, and accompanying drawings, where:

DETAILED DESCRIPTION OF THE EMBODIMENTS

Figure 1:
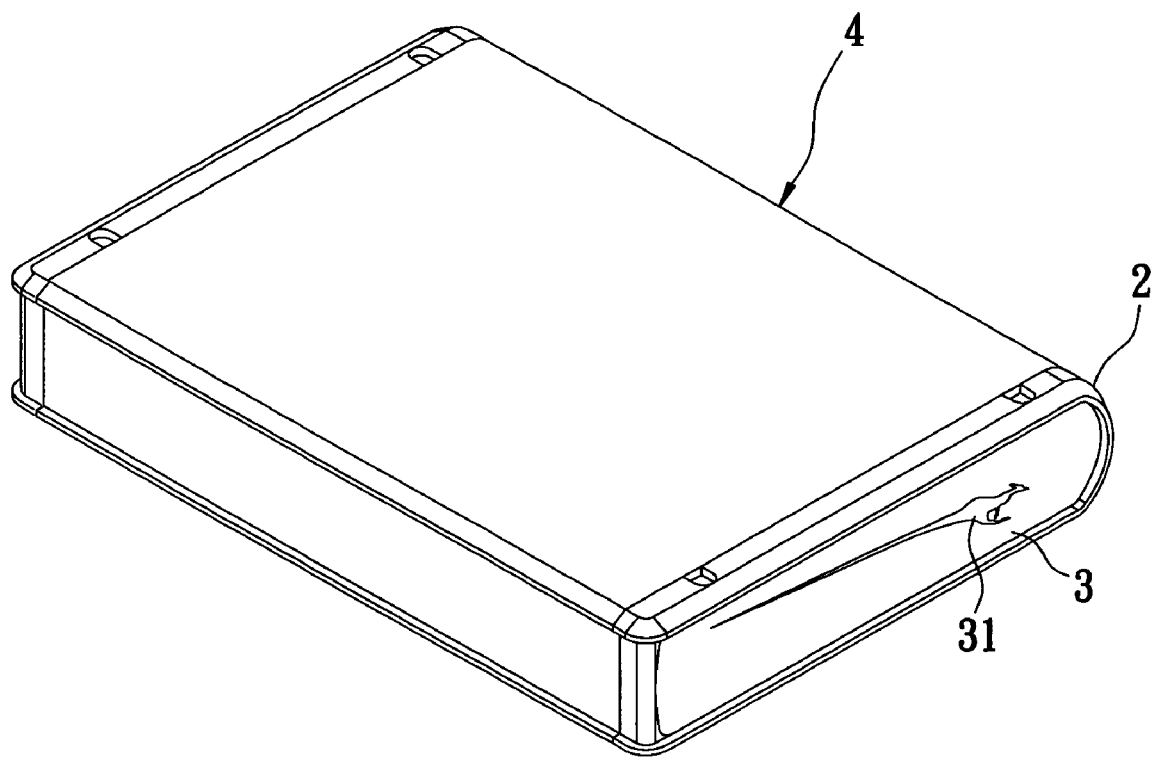
FIG. 1 is a perspective view according to the present invention.
Figure 2:
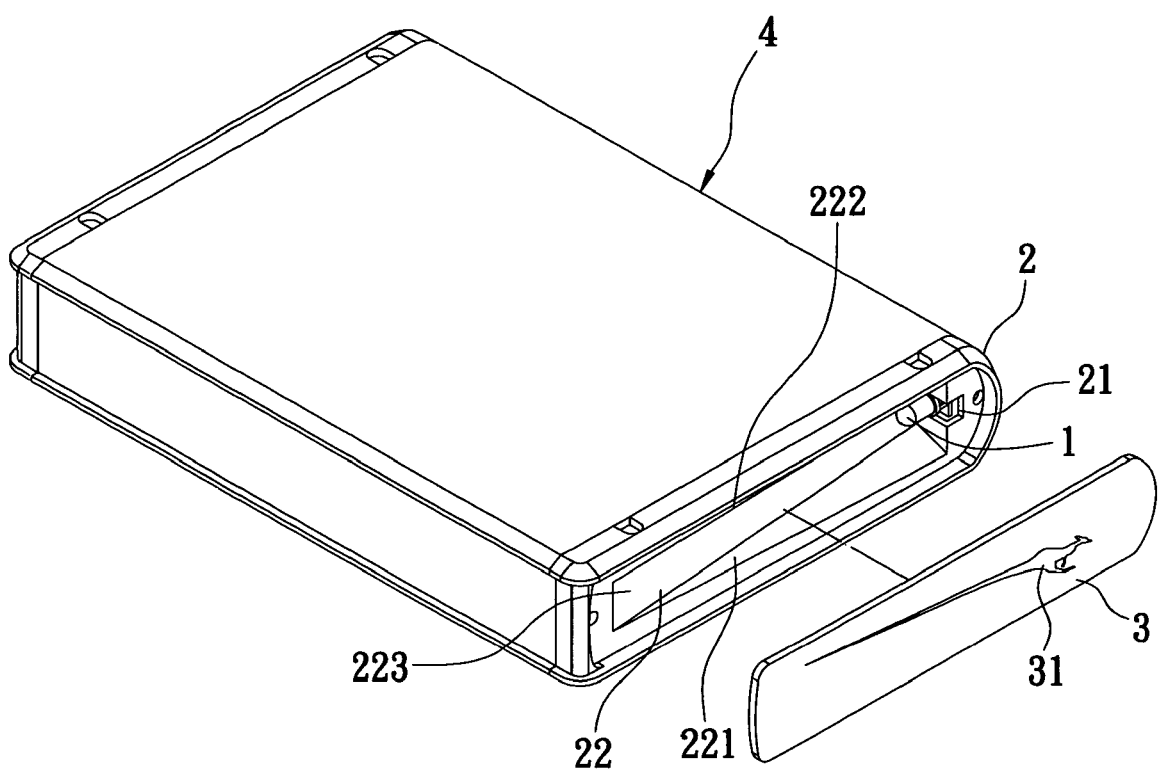
FIG. 2 is a partially decomposition view according to the present invention.
Figure 3:
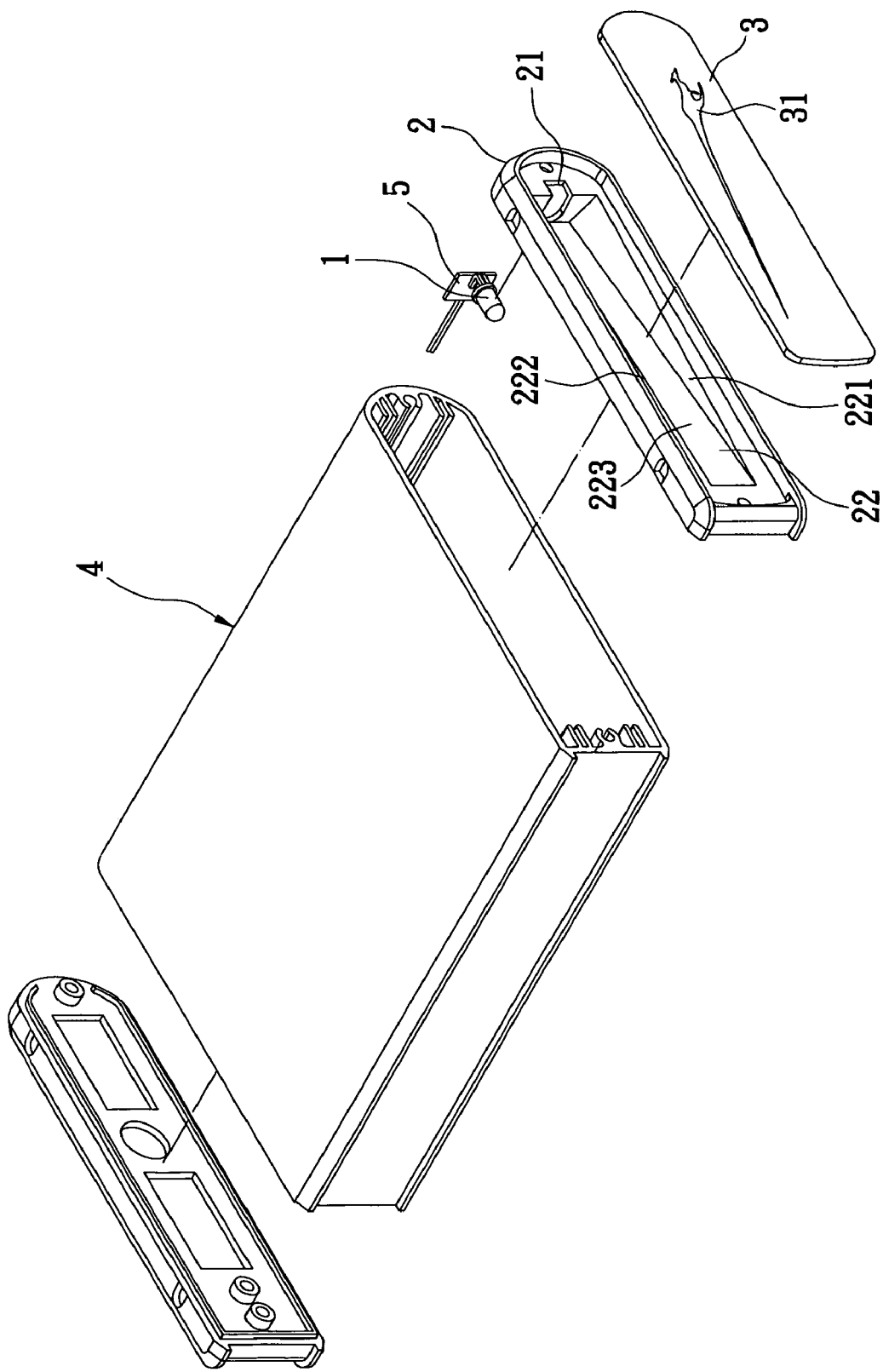
FIG. 3 is a decomposition view according to the present invention.
Figure 4:
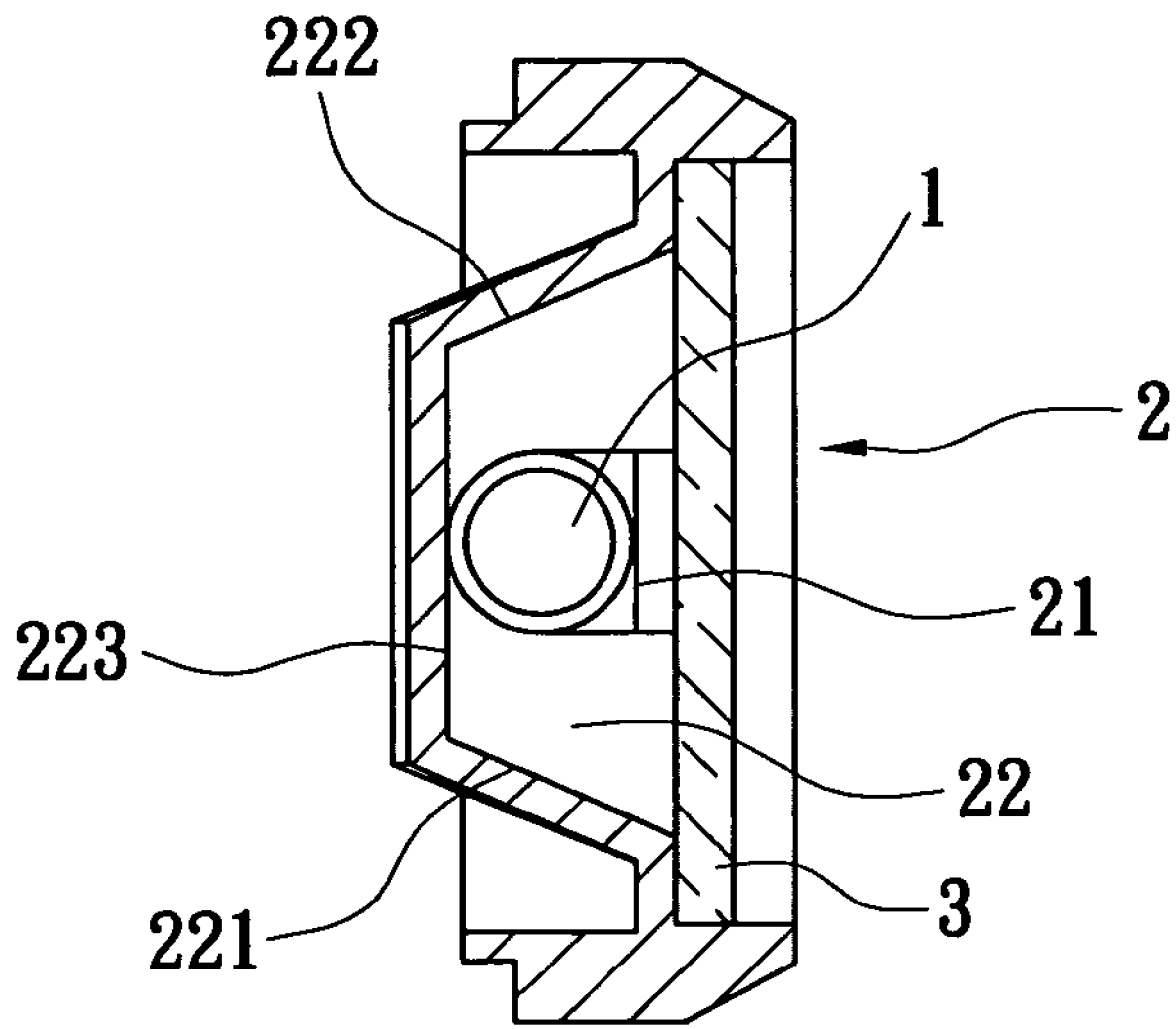
FIG. 4 is a cross-sectional profile according to the present invention.

With respects to FIGS. 1 to 4, a guiding light plate applied to peripherals can display their power and operational states and, moreover, project an LED lights onto a reflection plate to generate a uniform light distribution and, further, project an image lid to project an image, so as to embellish and advertise the peripherals thereof. The guiding light plate includes an LED (Light-Emitting Diode) 1 disposed on a predetermined one of the peripherals, a reflection plate 2 disposed in the predetermined peripheral, and an image lid 3 arranged in front of the reflection plate 2. The LED 1 electrically connects to a circuit board 5 for showing the states of power or operation, and the color of the LED 1 can be selected to meet the user's requirements, and different colors can display respective statuses. In this embodiment, there is just a single LED 1, but the quantity of the LED 1 can be as many as is required, or the LED can be replaced with an OLED (Organic Light-Emitting Diode). The circuit board 5 may have an IC with various functions for varying the light.

The reflection plate 2 is disposed in front of and secured to the predetermined peripheral 4 by either clamping or screwing. The reflection plate 2 has a through hole 21 formed thereon for mating with the LED 1 and a light-guiding face 22 with slot type formed in a front thereof, and the light-guiding face 22 includes a plurality of slanting faces 221, 222 and 223 for providing good reflectivity. The LED 1 is disposed at a side of the light-guiding face 22 for generating a uniform light distribution.

The image lid 3 has at least one transparent image portion 31 that has been formed by being printed, pasted or sprayed on. The image portion 31 can display letters, numerals, patterns, designs, totems, brand labels and so on. The image portion 31 is disposed in front of the reflection plate 2 and is secured to the reflection plate 2 by either clamping, screwing or sticking.

When the LED 1 is illuminated, light is projected onto the light-guiding face 22 of the reflection plate 2 for generating uniform distribution, so as to show the respective pattern via the lid 3. Therefore, the guiding light plate according to the present invention can display the power and operational status, and further provide an image via the image portion 31.

It should be apparent to those skilled in the art that the above description is only illustrative of specific embodiments and examples of the invention. The invention should therefore cover various modifications and variations made to the herein-described structure and operation of the invention, provided they fall within the scope of the invention as defined in the following appended claims.

What is claimed is:

1. A guiding light structure for to computer peripherals, comprising:

an LED (Light-Emitting Diode) disposed on a predetermined one of the computer peripherals;

a reflection plate disposed in the predetermined computer peripheral, having a slot type light-guiding face, the LED being disposed at a side of the light-guiding face, the light-guiding face including a first slanting face portion extending in continually sloped manner relative to the LED and at least one second slanting face portion projecting transversely from the first slanting face portion in continually sloped manner relative thereto; and an image lid having at least one transparent image portion, arranged in front of the reflection plate, the transparent image portion forming within a front surface of the image lid a window for the partial passage of light reflected by the light-guiding face, the window being peripherally contoured to define predetermined indicia.

2. The guiding light structure as claimed in claim 1, wherein the LED electrically connects to a circuit board.

3. The guiding light structure as claimed in claim 2, wherein the circuit board includes an IC with various functions.

4. The guiding light structure as claimed in claim 1, comprising a plurality of the LEDs.

5. The guiding light structure as claimed in claim 1, wherein the LED is an OLED (Organic Light-Emitting Diode).

6. The guiding light structure as claimed in claim 1, wherein the reflection plate has a least one through hole for mating with the LED.

7. The guiding light structure as claimed in claim 1, wherein the image portion is formed by printing, pasting or spraying the image lid thereabout.

8. The guiding light structure as claimed in claim 1, wherein the image portion displays letters, numerals, patterns, designs, totems or brand labels.

* * * * *